United States Patent [19]

Jay

[11] Patent Number: 4,786,080
[45] Date of Patent: Nov. 22, 1988

[54] CUSHION FOR VEHICLE SAFETY BELTS

[76] Inventor: Lawrence C. Jay, 1202 South St., Fremont, Ohio 43420

[21] Appl. No.: 138,797

[22] Filed: Dec. 28, 1987

[51] Int. Cl.⁴ ............................................. B60R 22/00
[52] U.S. Cl. ..................................... 280/808; 297/482
[58] Field of Search ................. 280/801, 808; 297/482

[56] References Cited

U.S. PATENT DOCUMENTS

| | | | |
|---|---|---|---|
| 3,306,662 | 2/1967 | Finnigan | 297/482 |
| 3,397,913 | 8/1968 | Fein | 297/482 |
| 3,572,833 | 3/1971 | Pavliscak | 297/483 |
| 3,957,282 | 5/1976 | Finnigan | 297/482 |
| 4,057,181 | 11/1977 | Finnigan et al. | 224/280 |
| 4,177,807 | 12/1979 | Ocal et al. | 128/133 |
| 4,341,422 | 7/1982 | Cunningham | 297/488 |
| 4,348,037 | 9/1982 | Law et al. | 280/733 |
| 4,502,732 | 3/1985 | Williams | 297/488 |
| 4,595,618 | 6/1986 | Caringer | 428/100 |
| 4,619,468 | 10/1986 | Spill | 280/801 |
| 4,678,205 | 7/1987 | Wold | 280/808 |
| 4,693,495 | 9/1987 | LaPointe | 280/808 |
| 4,699,401 | 10/1987 | Saenz | 280/808 |
| 4,741,574 | 5/1988 | Weightman et al. | 297/482 |

FOREIGN PATENT DOCUMENTS

| | | | |
|---|---|---|---|
| 3434010 | 6/1986 | Fed. Rep. of Germany | 297/482 |
| 3501747 | 9/1986 | Fed. Rep. of Germany | 297/482 |
| 2342188 | 9/1977 | France | 297/482 |
| 2436608 | 4/1980 | France | 297/482 |

Primary Examiner—Kenneth R. Rice
Attorney, Agent, or Firm—Richard C. Darr

[57] ABSTRACT

A cushion for vehicle safety belts or harnesses comprising a cylindrical body of resilient material adapted to be detachably affixed to a shoulder belt adjacent the neck of the wearer. The cylindrical body is partially split along its longitudinal axis to provide a slot for reception of the belt, and a fabric sleeve is fitted over the two sections of the split cylindrical body. Fastening means are provided on the sleeve for securing the open side of the tubular body together with the belt encased therein. The cushion thus presents a broad, resilient, gently curved surface in all directions and prevents abrasive contact of the belt with the clothing and neck of the wearer.

8 Claims, 1 Drawing Sheet

U.S. Patent    Nov. 22, 1988    4,786,080
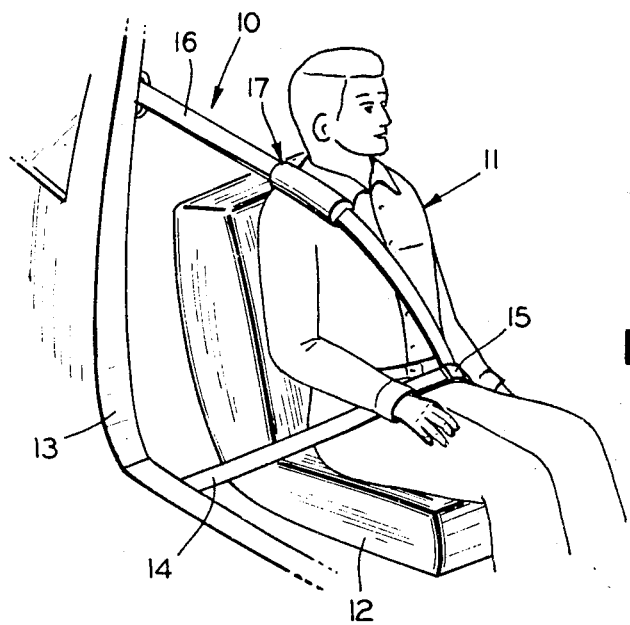
FIG. 1
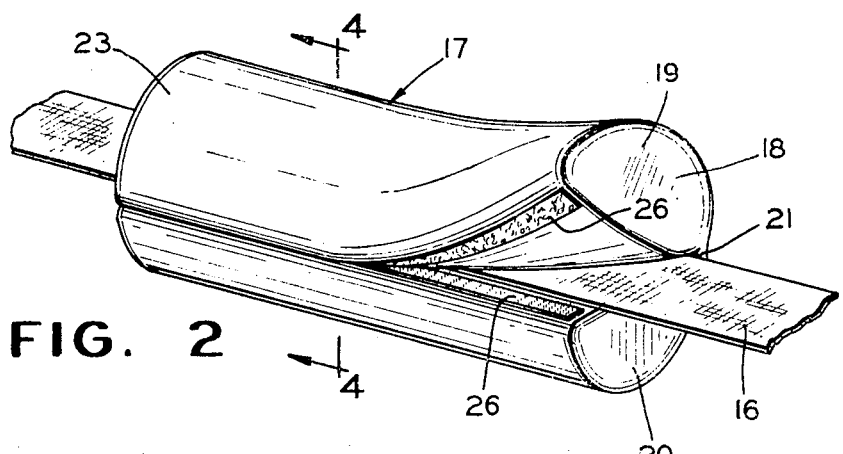
FIG. 2
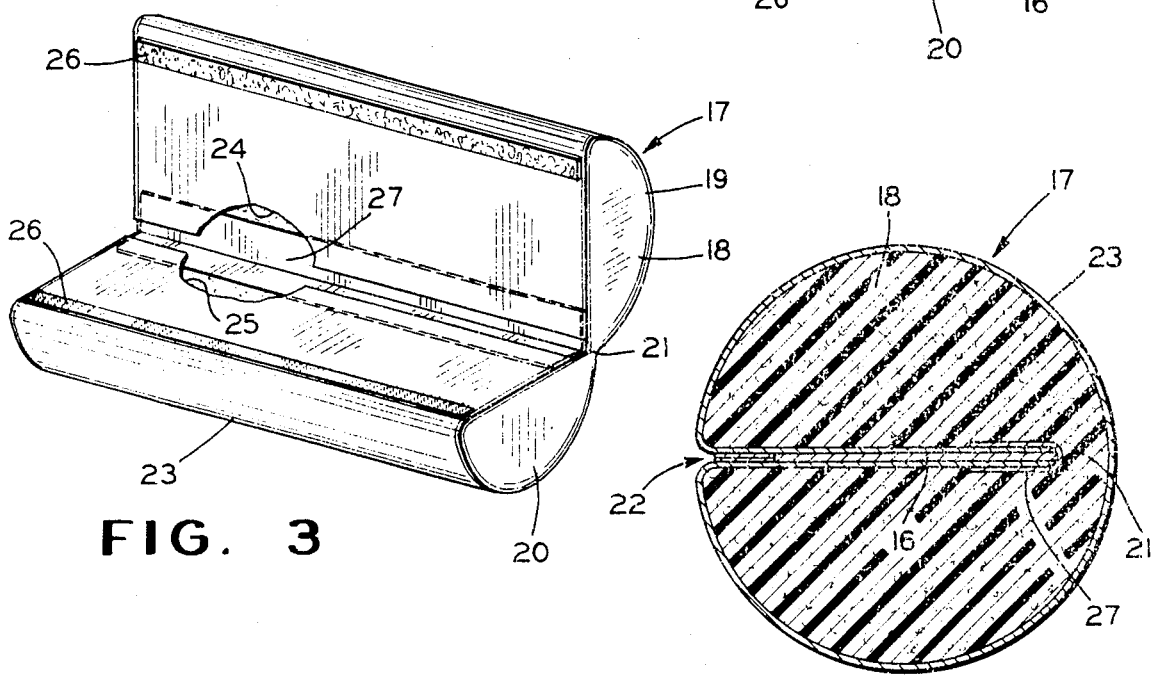
FIG. 3
FIG. 4

CUSHION FOR VEHICLE SAFETY BELTS

BACKGROUND OF THE INVENTION

1. Field of the Invention

The present invention pertains generally to passive belt-type restraints for protecting occupants of motor vehicles, and more particularly to a cushion device for attachment to such belts for providing comfort and additional safety to the restrained occupant.

2. Description of the Prior Art

Provision of shoulder harness occupant restraint systems in automotive vehicles has been mandatory in the United States for some time. Despite installation of warning devices in the vehicles and extensive use of educational programs extolling their virtues, the restraint systems were not widely used by vehicle occupants. This has led to widespread enactment of legislation mandating their use while the vehicle is operated on public highways. Even when faced with the threat of a substantial monetary fine and possible incarceration if apprehended driving without the restraint system in place, recent figures indicate that only about one half of the drivers are using them.

This widespread reluctance to utilize existing shoulder harness belts is believed due in large part to discomfort to the wearer and damage to clothing resulting from the belt, as well as a perceived possibility of injury to the neck area in the event of an accident or sudden stop.

Thus, such harnesses include a belt adapted to extend from an upper anchor point, over the shoulder, along side the neck and downwardly across the chest to an attachment point at seat level. In order to provide the required strength and flexibility with a minimum weight, the belts generally comprise a web of coarse woven material presenting relatively rough major surfaces and even more abrasive edges. Movement of the seated passenger in the travelling vehicle is inevitable, and the resulting constant rubbing abrades the clothing of the passenger and, more significantly, the edge of the belt tends to irritate his or her neck. Consequently, use of the harness can be very annoying. Moreover, despite statistics indicating a substantial reduction in serious injury and death as a result of the use of the shoulder harness, a certain segment of the travelling public perceives that in the event of a violent accident or abrupt stop, the belt itself, due to its thin profile and abrasive edge, can cause serious neck injuries. Consequently, many people decline to make use of the safety harness.

SUMMARY OF THE INVENTION

In accordance with the present invention, there is provided an attachment for vehicle safety belts or harnesses which obviates the aforementioned problems. The attachment comprises a cylindrical body of spongy, resilient material adapted to be detachably affixed to the shoulder belt adjacent the neck area of the user. The cylindrical body is partially split longitudinally so as to pivot open and provide a slot for reception of web belt. An aesthetically pleasing fabric sleeve is fitted over the split cylindrical body, and the fabric sleeve is provided with fastening means for securing the open edge of the device about the belt. The device may be positioned longitudinally along the belt so as to comfortably cushion the belt against the shoulder and neck of the wearer. Due to its cylindrical configuration the device protects the neck against irritation by the belt edge during normal driving, and prevents or reduces injury to the neck in the event of an accident or sudden stop. The fabric sleeve is sufficiently soft to prevent abrasive wear on the user's clothing, and to that end may be of a material such as velvet which will prevent relative movement between the device and the clothing.

It is, therefore, a primary object of the invention to provide a cushion device which will encourage occupants to use seat belts in automotive vehicles.

Another object of the invention is to provide such a device which will eliminate undue wear upon the clothing of vehicle passengers using seat belts.

Another object of the invention is to provide such a device which will greatly increase the comfort of the seat belt user.

Still another object is to provide such a device which will minimize injury to the neck area of the passenger in the event of an accident or abrupt stop involving the vehicle.

Yet another object is to provide such a cushion device which is aesthetically attractive, inexpensive to produce and convenient to use.

Other objects and advantages will become more apparent during the course of the following description when taken in connection with the accompanying drawings.

BRIEF DESCRIPTION OF THE DRAWINGS

In the drawings, wherein like numerals refer to like parts throughout:

FIG. 1 is a perspective view of a typical seat belt arrangement in place to restrain an automobile occupant and utilizing the cushion device of the invention;

FIG. 2 is an enlarged perspective view of a partially closed cushion device illustrating the manner in which it is mounted on a shoulder harness belt;

FIG. 3 is a perspective view illustrating the cushion device in the open position; and FIG. 4 is a transverse section taken substantially along line 4—4 of FIG. 2.

DESCRIPTION OF THE PREFERRED EMBODIMENT

Referring now to the drawings, there is shown generally at 10 a shoulder harness assembly for restraining a passenger 11 seated upon a seat 12 within an automotive vehicle body shown partially at 13. Such shoulder harness assemblies generally include a lap belt 14 affixed at one end to the vehicle body 13 and extending across the lap of the passenger 11 and secured at its other end to the vehicle body as by a releasable latch 15. A shoulder belt 16, likewise attached to the body 13 at one end above and behind the passenger, extends over his shoulder and across his chest to be likewise secured at its other end to the vehicle body by the releasable latch 15. In order to provide for adjustment in their length to accommodate different seat positions and passengers of different sizes, either or both the lap belt 14 and the shoulder belt 16 may conventionally include retracting locking reels (not shown) at their fixed ends where they are anchored to the vehicle body. They may also be adjustable at the releasable latch 15.

As shown in FIG. 1, in passing over the shoulder and across the chest the belt 16 rides upon the clothing of the wearer with its narrow edge adjacent his or her neck. In order to obviate the aforementioned undesirable effects of the shoulder belt and thereby to increase the likelihood that the shoulder harness will be utilized by passengers, there is provided a generally cylindrical cushion 17, adapted to be detachably mounted on and along the shoulder belt 16 in the region of the passenger's neck. The cushion thus envelops the belt so as to prevent it from contacting the clothing of the passenger in the shoulder area as well as his or her neck. The cushion is of a relatively soft resilient material so that it tends to readily deform and accommodate the shape of the surface with which it is pressed into contact. Since the cushion is cylindrical in cross section, the area of contact in any direction is thus enlarged and the unit pressure is minimized as the cushion is deformed. This capability, combined with the fact that the cushion is provided with a soft fabric cover, tends to not only reduce wear on the clothing and provide enhanced comfort to the passenger under normal driving, but also to minimize the severity of cosmetic injury to the neck and shoulder in the event of an abrupt stop or accident.

To that end the cushion 17, as best shown in FIGS. 2, 3 and 4, comprises a cylindrical body section 18 of a soft, resilient deformable material such as sponge rubber or one of the well-known synthetic foam materials. The body section is partially severed along its longitudinal axis to provide first and second semi-cylindrical segments 19 and 20, respectively, interconnected along a common edge by the unsevered material acting as a hinge portion 21. There is thus formed within the cylindrical body 18 between the semi-cylindrical segments, a slot 22 for receiving the shoulder belt 16 and along which the body 18 may be opened for mounting on or removing the cushion from the belt.

A sleeve 23 of a suitable cloth-like material or fabric covers the cylindrical body section 18 to present a soft, comfortable outer surface as well as a pleasing appearance. The sleeve is preferably of one piece construction and includes first and second pockets 24 and 25 configured to receive and snugly fit about the semi-cylindrical segments 19 and 20 respectively, and around the hinge portion 21 as shown in FIG. 4. Cooperating fastening means are provided along the corresponding open sides of the sleeve for securing the semi-cylindrical segments together. While any of the conventional fasteners such as zippers or hooks and loops may obviously be employed, a hook and loop fabric material such as that sold under the trade name "Velcro", is particularly well suited for this purpose. To that end, cooperating strips 26 of fastening material are affixed to opposite interior surfaces of the sleeve for enclosing the belt 16 within the slot 22 to thereby secure the cushion 17 on the belt. In order to prevent abrasive deterioration by the belt 16, a portective wear-resistant tape 27 is affixed as by adhesive means (not shown) to the foam body section 18 over the hinge 21 at the rear of the slot 22. The tape thus folds over the belt 16 when the cushion is in place and protects the foam body of the adjacent hinge portion 21 from destruction by the narrow abrasive edge of the belt.

As will be apparent, the cylindrical cushion may be readily installed on or removed from the shoulder harness assembly, as desired. In installing the cushion the two sections of the fastening means 26 are separated and the semi-cylindrical segments 18 and 19 are pivoted open about the hinge portion 21 so that the cushion may be slipped over the belt or, in other words, so that the belt 16 may be inserted in the slot 22. The cushion is positioned longitudinally along the belt in approximately the desired position adjacent the neck of the passenger, and the segments 18 and 19 are brought together so that the two strips 26 interlock to secure the cushion on the belt. There is sufficient friction between the belt and the material of the sleeve 23 so that the cushion will not freely slide along the belt. However, it may be manually slid longitudinally along the belt after installation to place it in the most comfortable position for protecting the clothing and neck of the passenger.

The novel cushion of the invention, as best seen in FIGS. 1 and 3, thus presents a wide, gently curved surface to both the neck of the passenger and his or her clothing. The sleeve 23 may be formed of soft velvet or fur-like materials or other suitable materials to further enhance comfort and avoid irritation to the neck. In the event of a sudden thrust of the passenger against the harness, the cylindrical cushion will deform and distribute the pressure over a relatively wide area regardless of its direction. Since the hinge portion 21 of the cylindrical body section 18 is interposed between the belt edge and the outer surface of the cushion facing the neck of the passenger, both the annoying rubbing effect of the rough edge on the neck during normal wearing and the traumatic effect in the event of an abrupt stop or accident are eliminated. It is thus believed apparent that the novel cylindrical cushion of the invention obviates the aforementioned problems with conventional safety harnesses and increases the likelihood that such devices will be utilized in their intended manner for the safety of vehicle passengers.

It is to be understood that the form of the invention herewith shown and described is to be taken as an illustrative embodiment only, and that various changes in the shape, size and arrangement of parts may be resorted to without departing from the spirit of the invention.

I claim:

1. A cushion apparatus for attachment to harness-type passive restraints in automotive vehicles for decreasing passenger resistance to utilization thereof, said harness including a belt adapted to extend over the shoulder, along the neck and across the chest of the passenger, comprising an elongated generally cylindrical body of soft, resilient material, said generally cylindrical body being partially severed along its longitudinal axis to define first and second semi-cylindrical sections interconnected along one edge by a hinge portion, said belt being adapted to be received between said semi-cylindrical sections with the edge of said belt facing the neck of said passenger adjacent said hinge portion, and means releasably securing said semi-cylindrical sections together along their free edges to secure said cushion apparatus on said belt at selected locations therealong.

2. A cushion apparatus for attachment to harness-type passive restraints in automotive vehicles as claimed in claim 1, including a sleeve fitted over said elongated, generally cylindrical body for engaging the neck and clothing of said passenger, said sleeve being of a non-abrasive, non-irritating material having an aesthetically pleasing appearance.

3. A cushion apparatus for attachment to harness-type passive restraints in automotive vehicles as claimed in claim 2, wherein said sleeve includes pockets receiving said first and second semi-cylindrical sections.

4. A cushion apparatus for attachment to harness-type passive restraints in automotive vehicles as claimed in claim 3, wherein said means releasably securing said semi-cylindrical sections together along their free edges comprises cooperating fastener means oppositely disposed along each said pocket.

5. A cushion apparatus for attachment to harness-type passive restraints in automotive vehicles as claimed in claim 4, wherein said fastener means comprises a strip of "Velcro"-type material affixed to each said pocket.

6. A cushion apparatus for attachment to harness-type passive restraints in automotive vehicles as claimed in claim 5, wherein said strips of Velcro-type material extend longitudinally throughout the length of said cushion.

7. A cushion apparatus for attachment to harness-type passive restraints in automotive vehicles as claimed in claim 1, including a wear-resistant reinforcing strip extending along the interior surface of said hinge portion of said cylindrical body for encasing the marginal edge of said belt to prevent abrasive wear of said hinge portion of said generally cylindrical body.

8. A cushion apparatus for attachment to harness-type passive restraints in automotive vehicles as claimed in claim 6, wherein said hinge portion of said generally cylindrical body is exposed between said pockets adjacent the edge of said belt, including a wear-resistant reinforcing strip extending along the interior surface of said hinge portion throughout the length of said generally cylindrical body for encasing the marginal edge portion of said belt to prevent abrasive wear of said hinge portion by said belt edge.

* * * * *